(12) United States Patent
Schuster et al.

(10) Patent No.: US 11,416,596 B2
(45) Date of Patent: Aug. 16, 2022

(54) SYSTEM AND METHOD FOR AUTHENTICATION ACROSS MULTIPLE PLATFORMS USING BIOMETRIC DATA

(71) Applicants: Bob A. Schuster, Aiea, HI (US); David Delaune, Honolulu, HI (US)

(72) Inventors: Bob A. Schuster, Aiea, HI (US); David Delaune, Honolulu, HI (US)

(*) Notice: Subject to any disclaimer, the term of this patent is extended or adjusted under 35 U.S.C. 154(b) by 154 days.

(21) Appl. No.: 17/016,157

(22) Filed: Sep. 9, 2020

(65) Prior Publication Data

US 2020/0410075 A1 Dec. 31, 2020

Related U.S. Application Data

(63) Continuation of application No. 15/960,299, filed on Apr. 23, 2018, now abandoned, which is a continuation-in-part of application No. PCT/IB2016/052871, filed on May 17, 2016, said application No. 15/960,299 is a continuation of application No. PCT/IB2018/052821, filed on Apr. 23, 2018.

(60) Provisional application No. 62/244,571, filed on Oct. 21, 2015.

(51) Int. Cl.
| H04L 29/06 | (2006.01) |
| G06F 21/32 | (2013.01) |
| G06F 21/34 | (2013.01) |
| G06F 21/41 | (2013.01) |

(52) U.S. Cl.
CPC ............. *G06F 21/32* (2013.01); *G06F 21/34* (2013.01); *G06F 21/41* (2013.01)

(58) Field of Classification Search
CPC .......... G06F 21/32; G06F 21/34; G06F 21/41
USPC ...................................................... 713/186
See application file for complete search history.

(56) References Cited

U.S. PATENT DOCUMENTS

| 2006/0033809 A1* | 2/2006 | Farley | H04M 3/428 348/14.02 |
| 2016/0261828 A1* | 9/2016 | Ge | G06V 40/16 |
| 2017/0364674 A1* | 12/2017 | Grubbs | G06F 21/40 |

* cited by examiner

*Primary Examiner* — Evans Desrosiers
(74) *Attorney, Agent, or Firm* — Hornkohl Intellectual Property Law, PLLC; Jason L. Hornkohl

(57) ABSTRACT

A system and method for authenticating a system user across multiple digital systems using a single biometric key employs a scanning device to preclude the use of passwords and login identifiers when signing into secured digital environments. The scanning device performs a primary biometric scanning operation to obtain a primary multipoint digital image for an anatomical feature of the system user. The primary multipoint digital image is then associated with a system password and username for each of a plurality of secured digital systems. By connecting the scanning device to an external computing device and performing a subsequent biometric scanning operation, the scanning device is able to authenticate the system user and retrieve the system password and username for a specific secured digital system from the plurality of secured digital systems. A data vault is provided to back-up data and restore the scanning device when the system user is authenticated.

20 Claims, 18 Drawing Sheets

SYSTEM AND METHOD FOR AUTHENTICATION ACROSS MULTIPLE PLATFORMS USING BIOMETRIC DATA

The current application is a 371 of international PCT application serial number PCT/IB2016/052871 filed on May 17, 2016 which claims benefit of U.S. provisional patent application Ser. No. 62/244,571 filed on Oct. 21, 2015.

FIELD OF THE INVENTION

The present invention relates generally to a biometric scanner based user authentication platform. More specifically the present invention is a system and method which enables an individual to use a single biometric data key in place of a plurality of passwords.

BACKGROUND OF THE INVENTION

Creating secured digital environments is essential in the modern age. One needs to only turn on the news to hear of data breach scandal after data breach scandal. Everyone, from the average citizen to Fortune 500 companies, has become a target for malevolent individuals seeking to access secure information. To combat the ever increasing frequency of brazen virtual attacks, users are forced to implement authentication protocols of greater and greater complexity. To compound the problem of the increasingly complex data security protocols, users must memorize multiple passwords for multiple digital services.

The problem of passwords can be likened to a curse of dimensionality. That is, as users are required to create multiple passwords to access an ever increasing number of digital systems, the difficulty in maintaining these passwords increases for the user. A common response to this problem is to use a single password for multiple services. This practice, however, is quite flawed and decreases the overall security of a user's personal information. If a malicious individual is able to acquire this password, he will be able to access many of the user's accounts. Therefore, users seem to be in a double bind situation. Biometric authentication has been proposed as a possible means of mitigating this issue. Because biometric data is intrinsically unique, it negates the need to memorize passwords for user authentication. One noticeable failing is the depth of penetration of digital services which accept biometric user authentication. Because of this, the effectiveness of robust biometric authentication systems is significantly reduced. At times users must memorize some passwords, in other instances they are able to biometrically authenticate.

Therefore, it is an object of the present invention to provide a biometric scanner that can be used for authentication across multiple platforms. The present invention addresses the issue of memorizing multiple passwords by providing a biometric authentication platform which generates, or inserts, valid passwords into various digital systems. This is accomplished by creating a digital user profile for a system user; the digital user profile containing the username and password data required to access a plurality of secured digital systems. Once the digital user profile is created, a scanning software correlates biometric data obtained from an anatomical feature of the system user with the username and password data required to access the plurality of secured digital systems. Using the platform provided by the present invention enables the system user to forego the arduous process of creating and memorizing passwords.

It is another object of the present invention to provide a data vault that can be used to back-up the scanning device and restore data on the scanning device. The scanning device can be docked in the data vault, wherein the data vault is able to determine whether to perform a back-up function or a restore function. The scanning software on the scanning device is used to authenticate the system user before performing either the back-up function or the restore function. In this way, data can be securely maintained on the data vault.

DETAIL DESCRIPTIONS OF THE INVENTION

Figure 1:
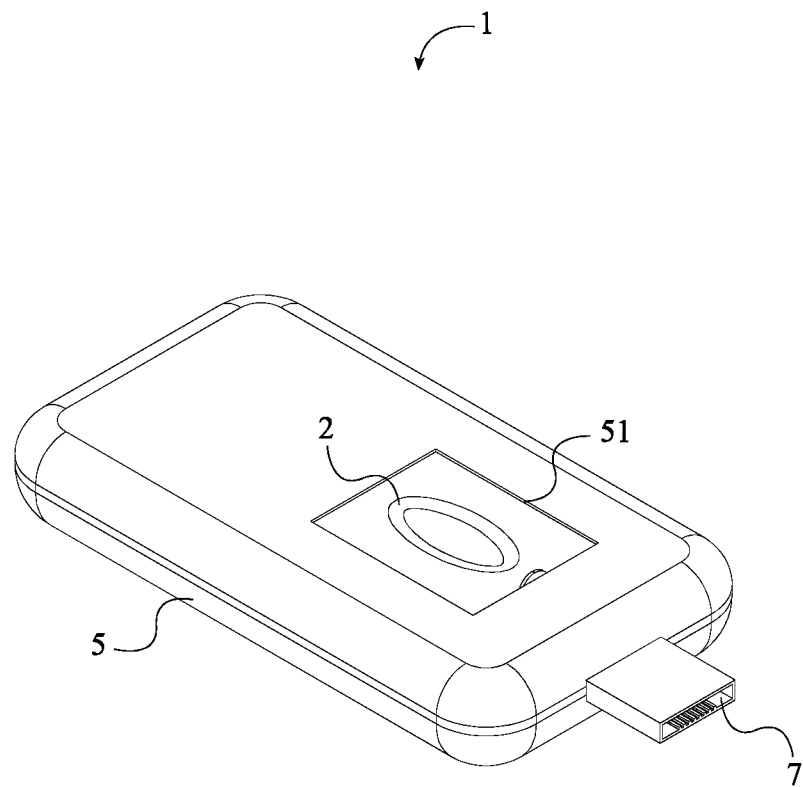
FIG. 1 is a perspective view of the scanning device, wherein the biometric scanner and the external device interconnect are in the extended position.

All illustrations of the drawings are for the purpose of describing selected versions of the present invention and are not intended to limit the scope of the present invention.

The present invention is a system and method for authenticating a system user across multiple digital systems using a single biometric key. It is an aim of the present invention to provide a handheld device and an associated software platform which work in concert to function as a physical key enabling user authentication on digital systems. In reference to FIG. 1, the present invention includes a scanning device 1 that is designed to use biometric information to authenticate the system user in lieu of traditional passwords. Additionally, the present invention utilizes a scanning software in conjunction with the scanning device 1, wherein the scanning software is operated on the scanning device 1. Furthermore and in reference to FIG. 12-13, the present invention includes a data vault 10 that is used to back-up and restore the scanning device 1.

The scanning device 1 acquires and stores biometric data, while the scanning software analyzes the biometric data. The biometric data acquired by the scanning device 1 is used to access a plurality of secured digital systems in place of using traditional passwords. In the preferred embodiment of the present invention, the scanning software performs the translation and handshaking operations required to use the biometric data of the system user as an access code for the plurality of secured digital systems. The data vault 10 is used to store a back-up copy of the biometric data and system passwords, wherein the data vault 10 can be used to restore the scanning device 1 if the scanning device 1 is compromised. Furthermore, the latest settings of the scanning device can be copied from the scanning device 1 to the data vault 10 in order to synchronize both devices.

In the preferred method of use, the present invention provides a secured authentication platform which maintains a locally encrypted record of user data. To accomplish this task, the scanning device 1 comprises a biometric scanner 2, a microcontroller 3, an onboard memory bank 4, and an external device interconnect 7 [100]. The scanning software runs on the microcontroller 3 to perform all required password selection, encryption, and generation operations. To begin using the scanning device 1 as a password manager for the plurality of secured digital systems, the system user creates a digital user profile with the scanning software. The digital user profile contains a list of each of the plurality of secured digital systems with which the system user is affiliated. Additionally, the digital user profile contains a system password for each of the plurality of secured digital systems in order to access each of the plurality of secured digital systems.

Figure 6:
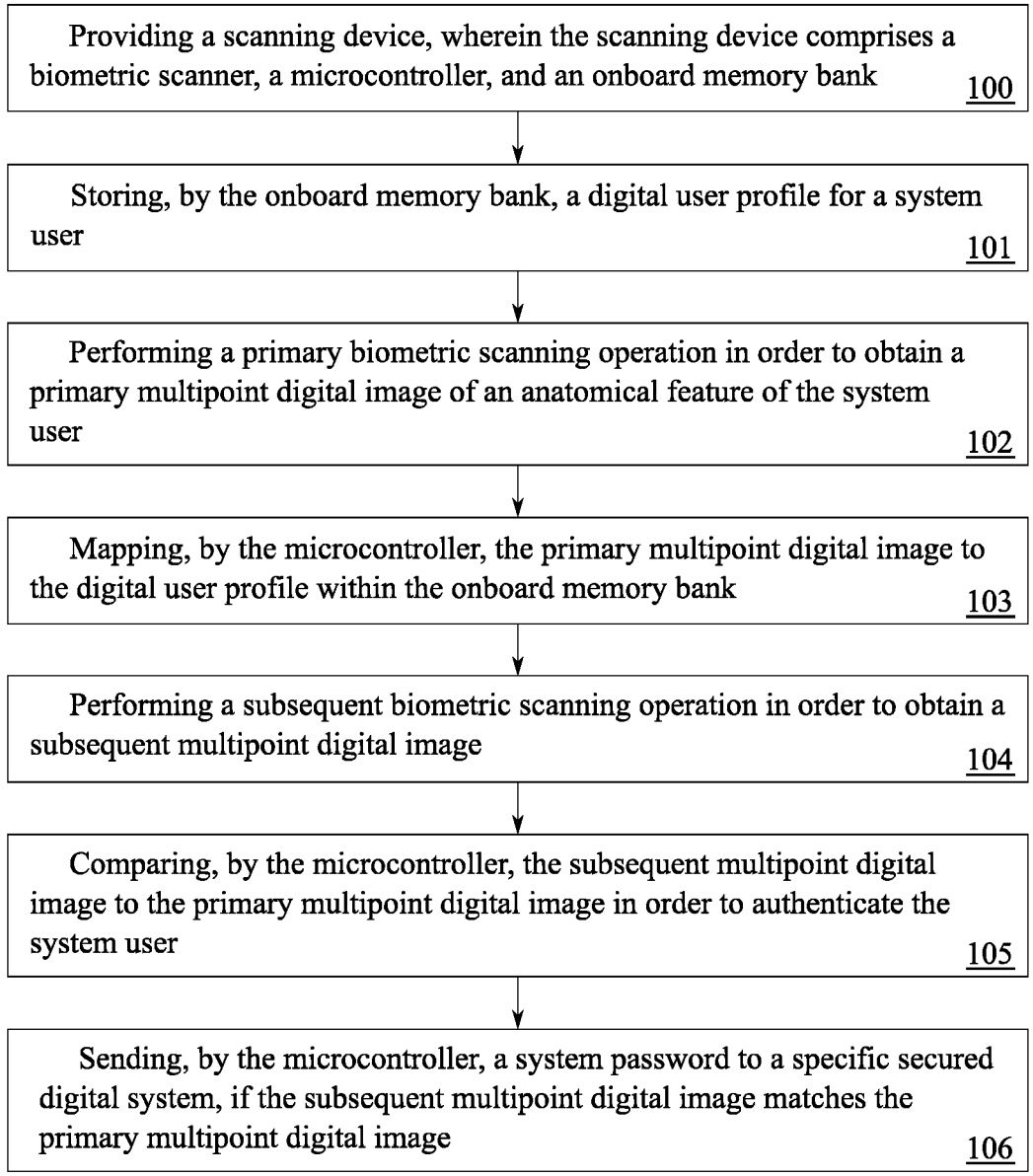
FIG. 6 is a flowchart depicting the steps for authenticating a system user across multiple digital systems.

In reference to FIG. 1 and FIG. 6, in the preferred embodiment of the present invention, the microcontroller 3 creates the digital user profile using the scanning software [107], wherein the digital user profile is then stored by the onboard memory bank 4 [101]. The digital user profile is utilized to associate the system password for each of the plurality of secured digital systems to only one individual, the system user. In reference to FIG. 8, the system user selects the plurality of secured digital systems to be used with the present invention, wherein the microcontroller 3 then receives the system password for each of the plurality of secured digital systems [109]. The system password for each of the plurality of secured digital systems can be entered manually by the system user or retrieved automatically by the microcontroller 3 when associating the plurality of secured digital systems with the digital user profile. The information is then passed along by the microcontroller 3 to the onboard memory bank 4, wherein the onboard memory bank 4 stores the list of the plurality of secured digital systems and the system password for each of the plurality of secured digital systems [111].

After the digital user profile is created, the system user places a finger onto the scanning device 1; more specifically, onto the biometric scanner 2. In reference to FIG. 6, the biometric scanner 2 then performs a primary biometric scanning operation in order to obtain a primary multipoint digital image of an anatomical feature of the system user [102]. In the preferred embodiment of the present invention, the primary biometric scanning operation is a fingerprint scan, wherein the anatomical feature is a fingerprint.

Figure 9:
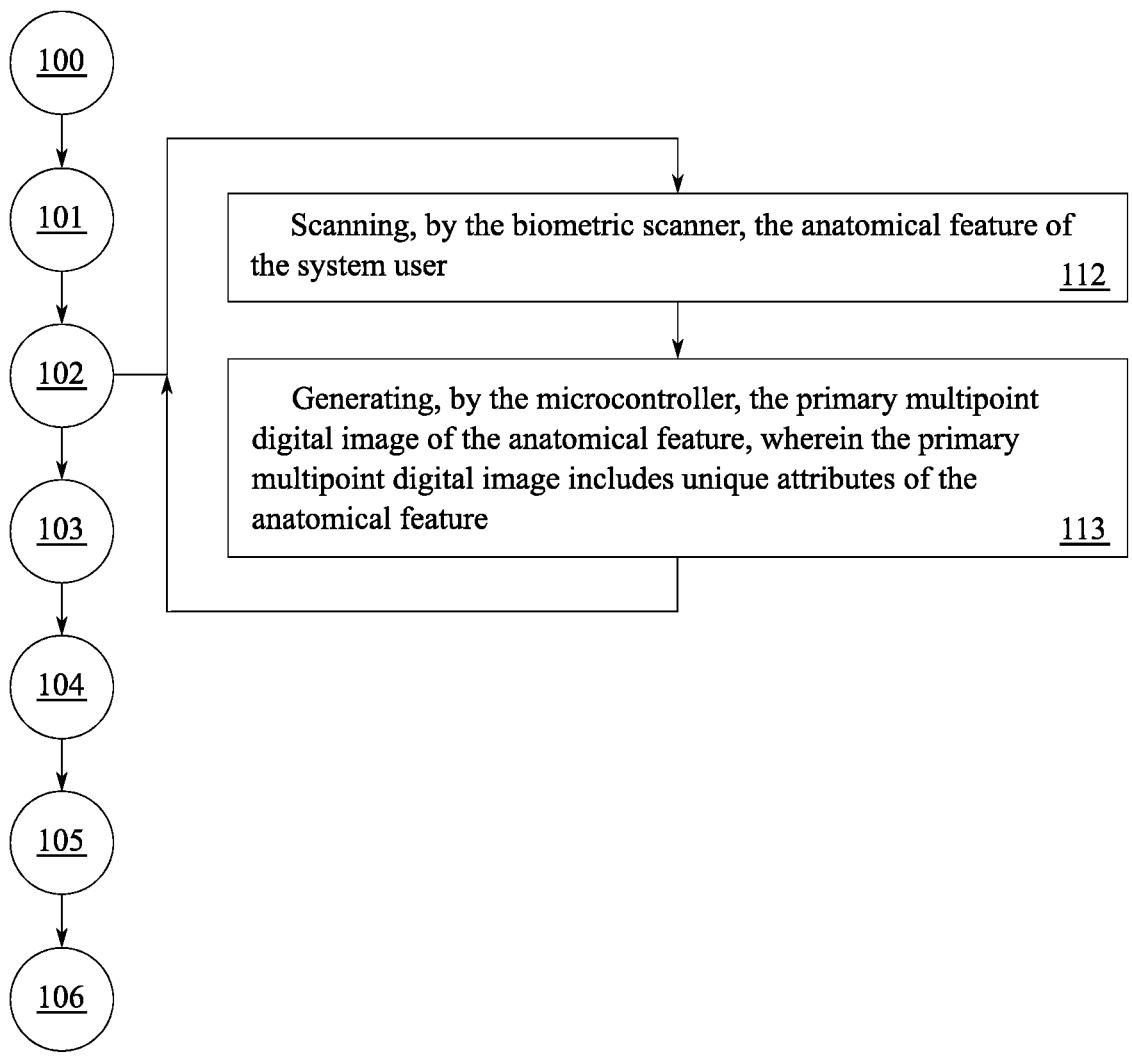
FIG. 9 is a flowchart thereof, further depicting steps for performing the primary biometric scanning operation.

In reference to FIG. 9, first the biometric scanner 2 scans the anatomical feature of the system user in order to obtain the necessary biometric data [112]. The microcontroller 3 then utilizes the biometric data to generate the primary multipoint digital image of the anatomical feature, wherein the primary multipoint digital image includes unique attributes of the anatomical feature [113].

Figure 7:
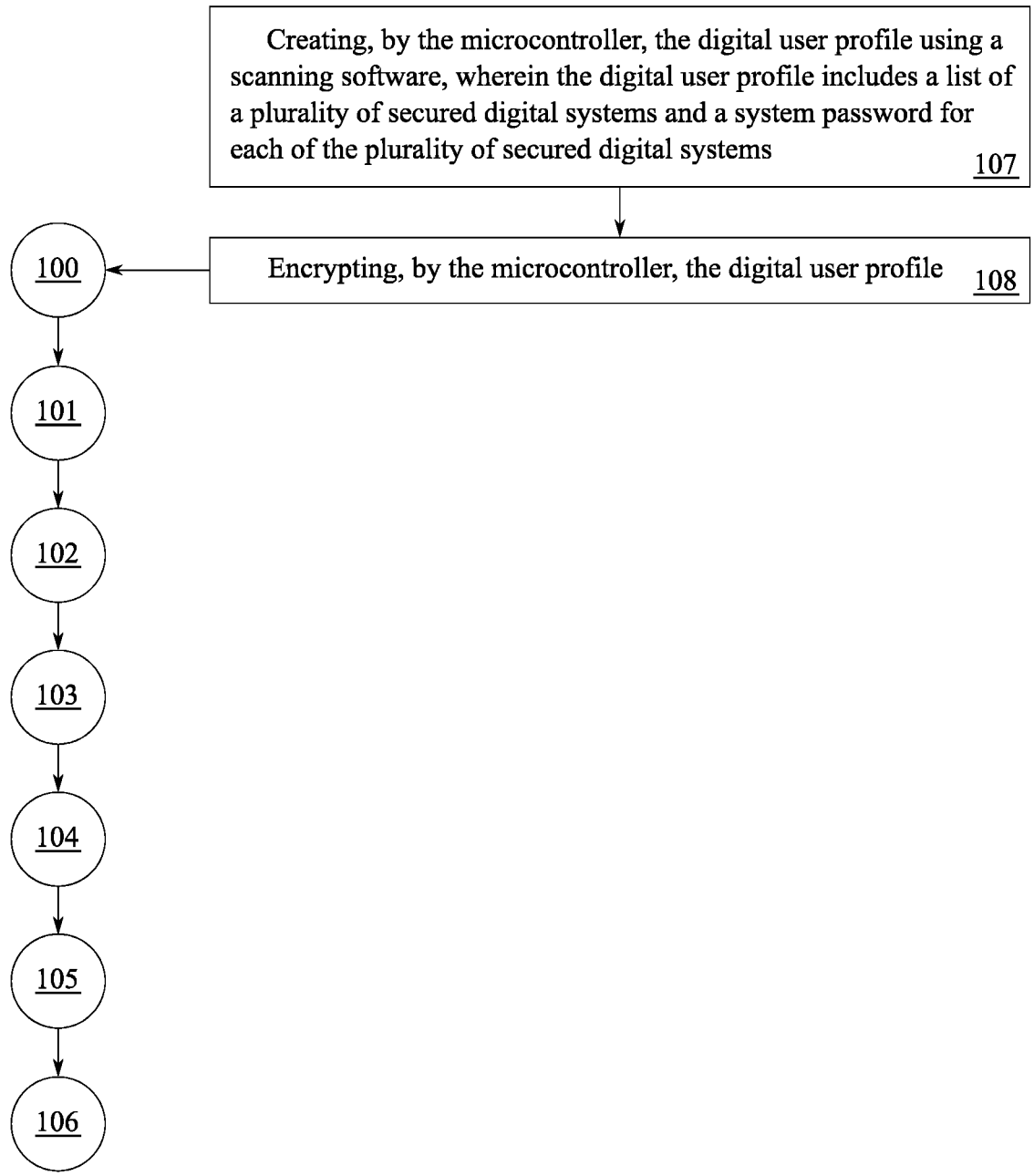
FIG. 7 is a flowchart thereof, further depicting steps for creating and encrypting the digital user profile.
Figure 10:
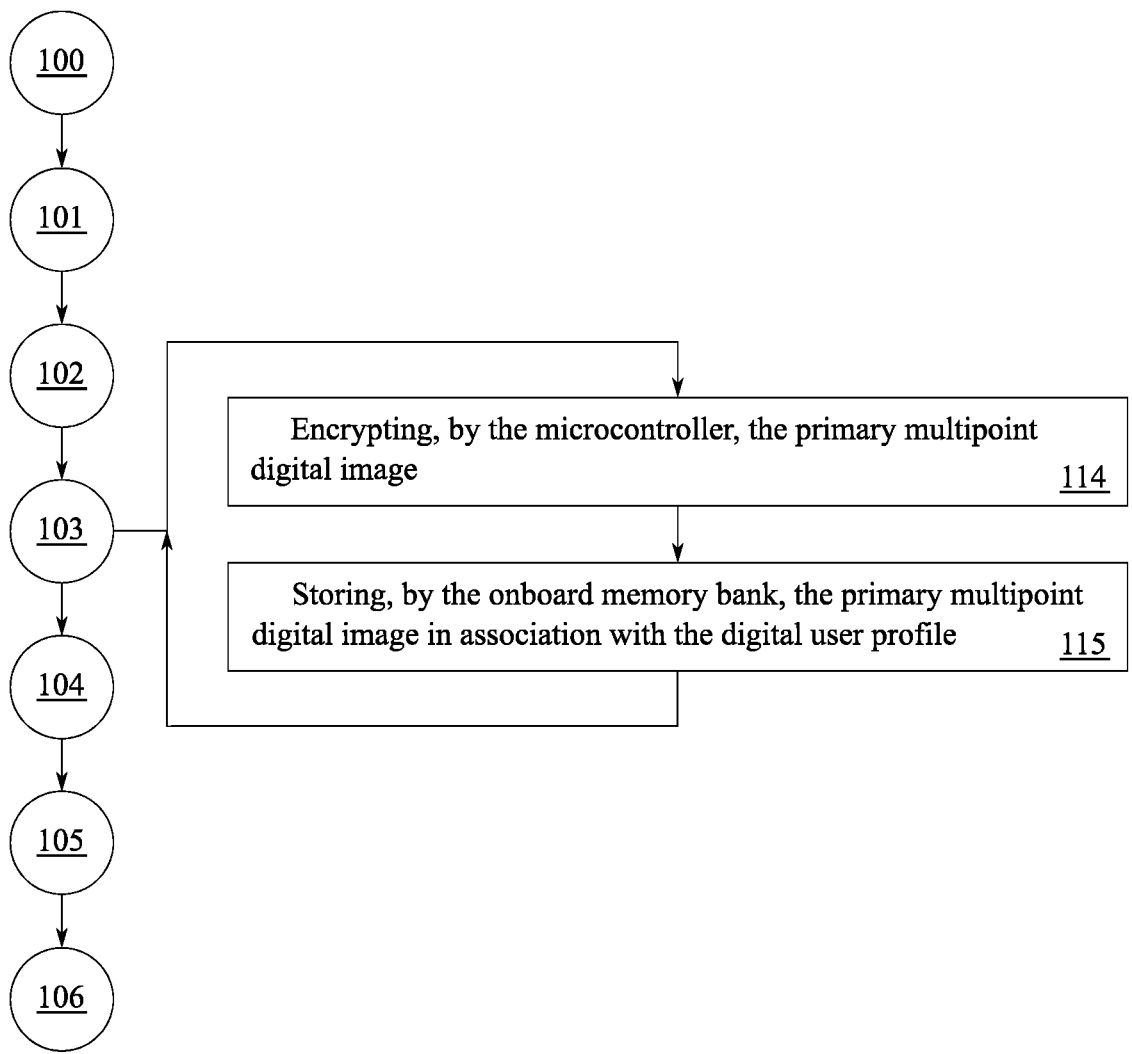
FIG. 10 is a flowchart thereof, further depicting steps for mapping the primary multipoint digital image within the onboard memory bank.

In reference to FIG. 10 and FIG. 7, the primary multipoint digital image and the digital user profile are then encrypted by the microcontroller 3 [114] [108] and stored on the onboard memory bank 4. When storing the primary multipoint digital image, the microcontroller 3 maps the primary multipoint digital image to the digital user profile within the onboard memory bank 4 [103], as depicted in FIG. 6. In mapping the primary multipoint digital image to the digital user profile, the scanning software correlates the primary multipoint digital image to the system password of each of the plurality of secured digital systems registered within the digital user profile. With the primary multipoint digital image stored in association with the digital user profile on the onboard memory bank 4 [115], the primary multipoint digital image is used as a unique password for accessing the digital user profile. The system user is then able to access the plurality of secured digital systems using the biometric data obtained from the anatomical feature, in place of entering the system password for each of the plurality of secured digital systems.

Figure 8:
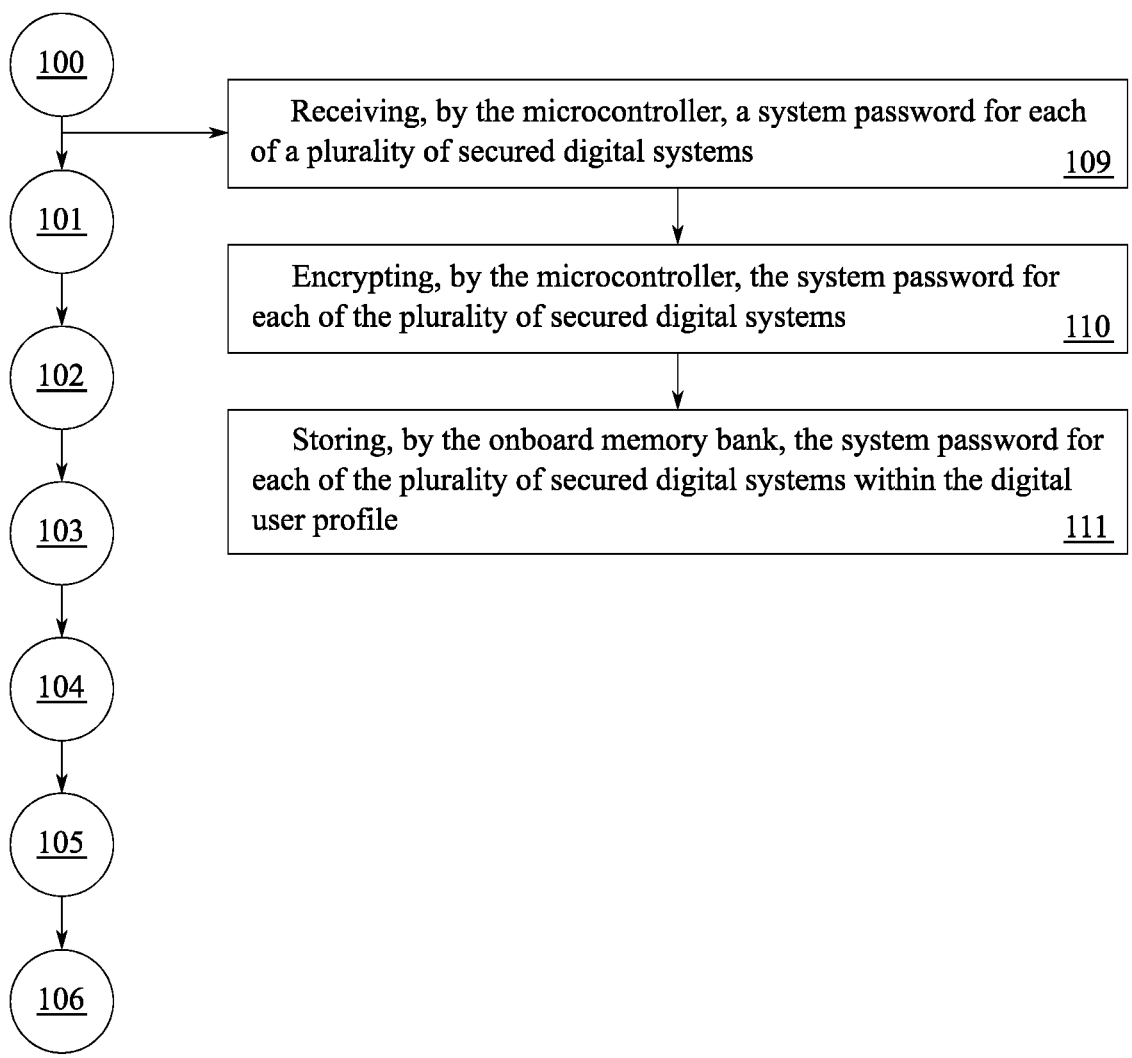
FIG. 8 is a flowchart thereof, further depicting steps for encrypting and storing the system password for each of the plurality of secured digital systems.

In reference to FIG. 8, it is also possible for the microcontroller 3 to encrypt the system password of each of the plurality of secured digital systems in order to add an extra layer of security [110]. Upon receiving the system password for each of the plurality of secured digital systems, the microcontroller 3 would first encrypt the system password and then map the system password within the digital user profile. Once the system password for each of the plurality of secured digital systems has been encrypted and added to the digital user profile, the microcontroller 3 encrypts the digital user profile, providing a second layer of encryption. Alternatively, only the system password for each of the plurality of secured digital systems could be encrypted instead of encrypting the entirety of the digital user profile, wherein the primary multipoint digital image would be mapped directly to the system password for each of the plurality of secured digital systems.

Figure 11:
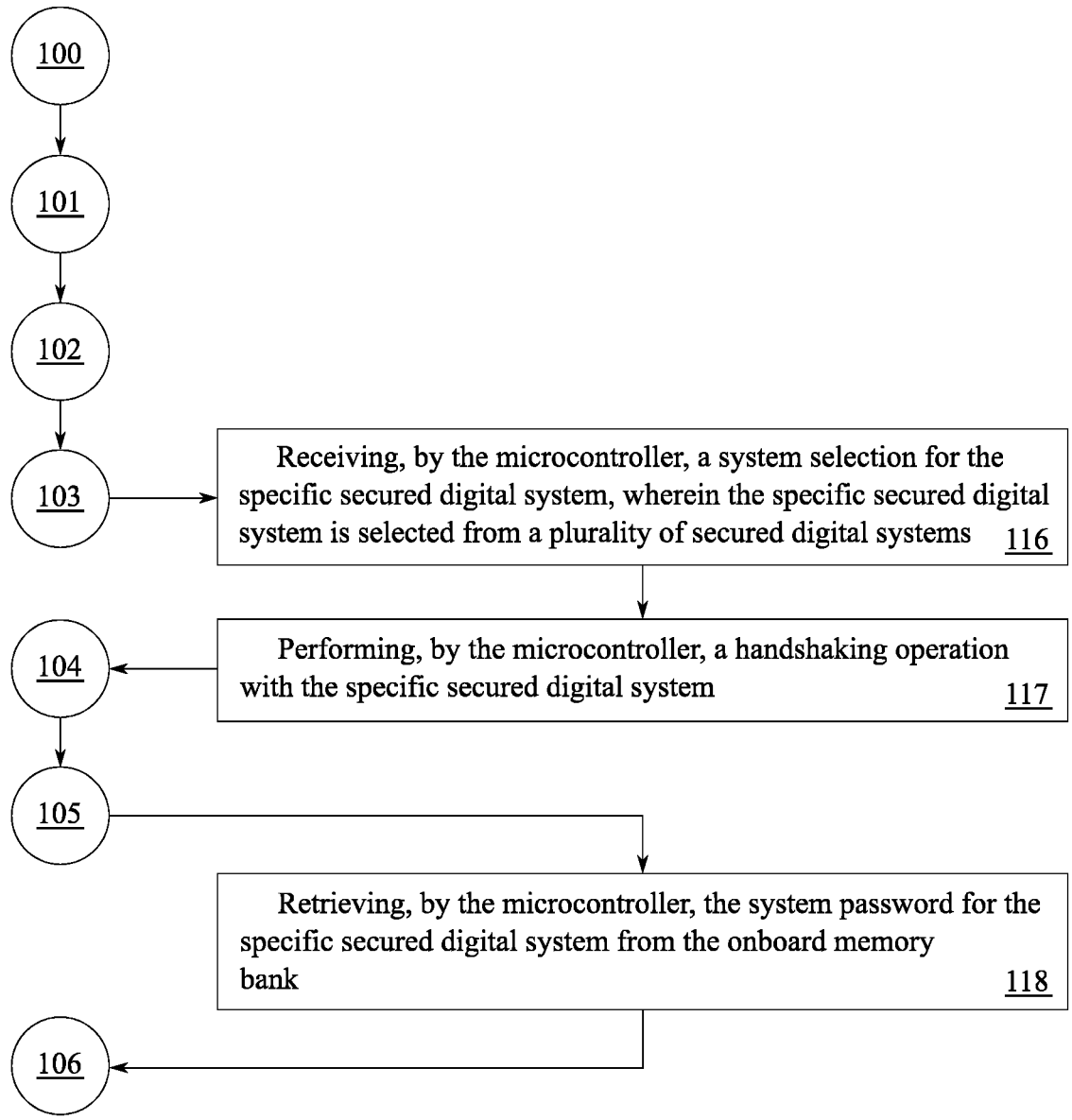
FIG. 11 is a flowchart thereof, further depicting steps for selecting the specific secured digital system from the plurality of secured digital systems, and retrieving the system password for the specific secured digital system.

When the system user desires to access a specific secured digital system from the plurality of secured digital systems, the system user first connects the scanning device 1 to an external computing device. The term 'external computing device' is used herein to refer to any electronic system capable of accessing—or requesting access to—secured digital environments. Examples of external computing devices include, but are not limited to, computers, smartphones, tablets, security systems, and the like. In reference to FIG. 11, once connected to the external computing device, the microcontroller 3 receives a system selection for the specific secured digital system [116]. The microcontroller 3 then performs a handshaking operation with the specific secured digital system in order to establish communications between the scanning device 1 and the specific secured digital system [117].

After the scanning device 1 is connected to the external computing device and the handshaking operation is performed with the specific secured digital system, a subsequent biometric scanning operation can be carried out to authenticate the system user. In reference to FIG. 6, the subsequent biometric scanning operation is performed by the biometric scanner 2 in order to obtain a subsequent multipoint digital image [104]. The subsequent biometric scanning operation is identical to the primary biometric scanning operation in that the subsequent biometric scanning operation attempts to capture the same type of biometric data that is captured during the primary biometric scanning operation. For example, if the primary biometric scanning operation is a fingerprint scan, then the subsequent biometric scanning operation is also a fingerprint scan.

To perform the subsequent biometric scanning operation, the biometric scanner 2 first scans the anatomical feature of the system user in order to obtain the necessary biometric data. The microcontroller 3 then utilizes the biometric data to generate the subsequent multipoint digital image of the anatomical feature, wherein the subsequent multipoint digital image includes unique attributes of the anatomical feature. In reference to FIG. 6, the microcontroller 3 then compares the subsequent multipoint digital image to the primary multipoint digital image in order to authenticate the system user [105]. If the subsequent multipoint digital image matches the primary multipoint digital image, then access is granted to the digital user profile. Conversely, if the subsequent multipoint digital image does not match the primary multipoint digital image, then access to the digital user profile is denied.

When the system user is successfully authenticated by matching the subsequent multipoint digital image to the primary multipoint digital image, the microcontroller 3 searches through the list of the plurality of secured digital systems for the specific secured digital system. In reference to FIG. 11, the microcontroller 3 then retrieves the system password for the specific secured digital system from the onboard memory bank 4 [118]. Finally, the microcontroller 3 sends the system password for the specific secured digital system to the specific secured digital system [106], as depicted in FIG. 6, wherein the system user is authenticated on the specific secured digital system. In summary, the scanning software authenticates the system user identity via the anatomical feature, retrieves the system password for the specific secured digital system, and then inserts the system password into the specific secured digital system. In this way, the present invention is able to function as a single key which is capable of accessing each of the plurality of secured digital systems registered within the digital user profile.

In the preferred embodiment of the present invention, the primary biometric scanning operation performed by the biometric scanner 2 acquires fingerprint data. The system user places a finger on the biometric scanner 2, wherein the biometric scanner 2 scans the finger and the microcontroller 3 generates the primary multipoint digital image of the finger. To access the plurality of secured digital systems each subsequent time, the system user places the finger on the biometric scanner 2, wherein the subsequent multipoint digital image is generated to authenticate the system user. In other embodiments of the present invention, various other types of biometric data may be acquired. For example, the primary biometric scanning operation may be a retinal scan, vocal scan to obtain vocal fingerprints, or a vein map.

Figure 15:
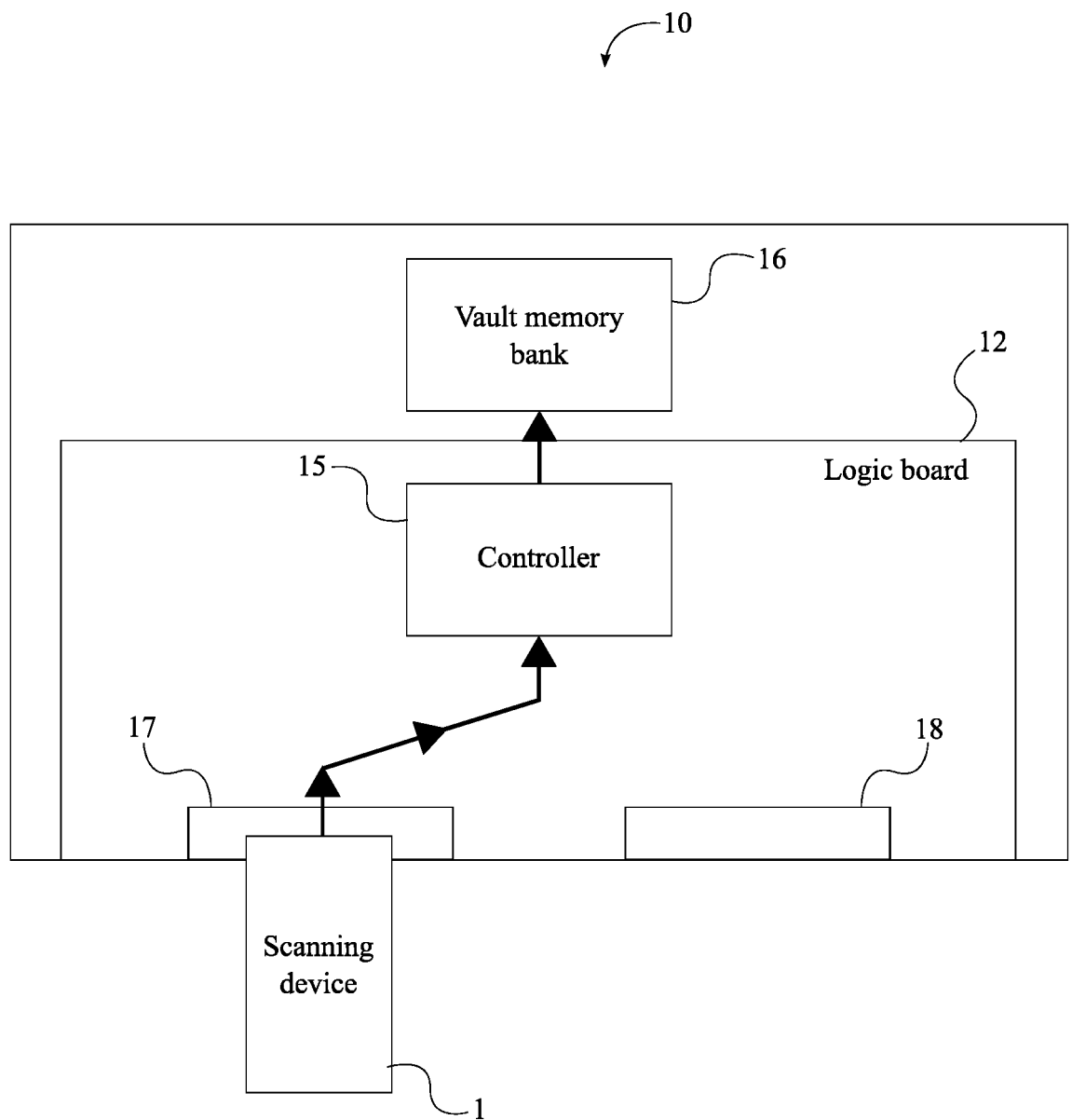
FIG. 15 is a diagram depicting the flow of data when the scanning device is plugged into the first port.
Figure 16:
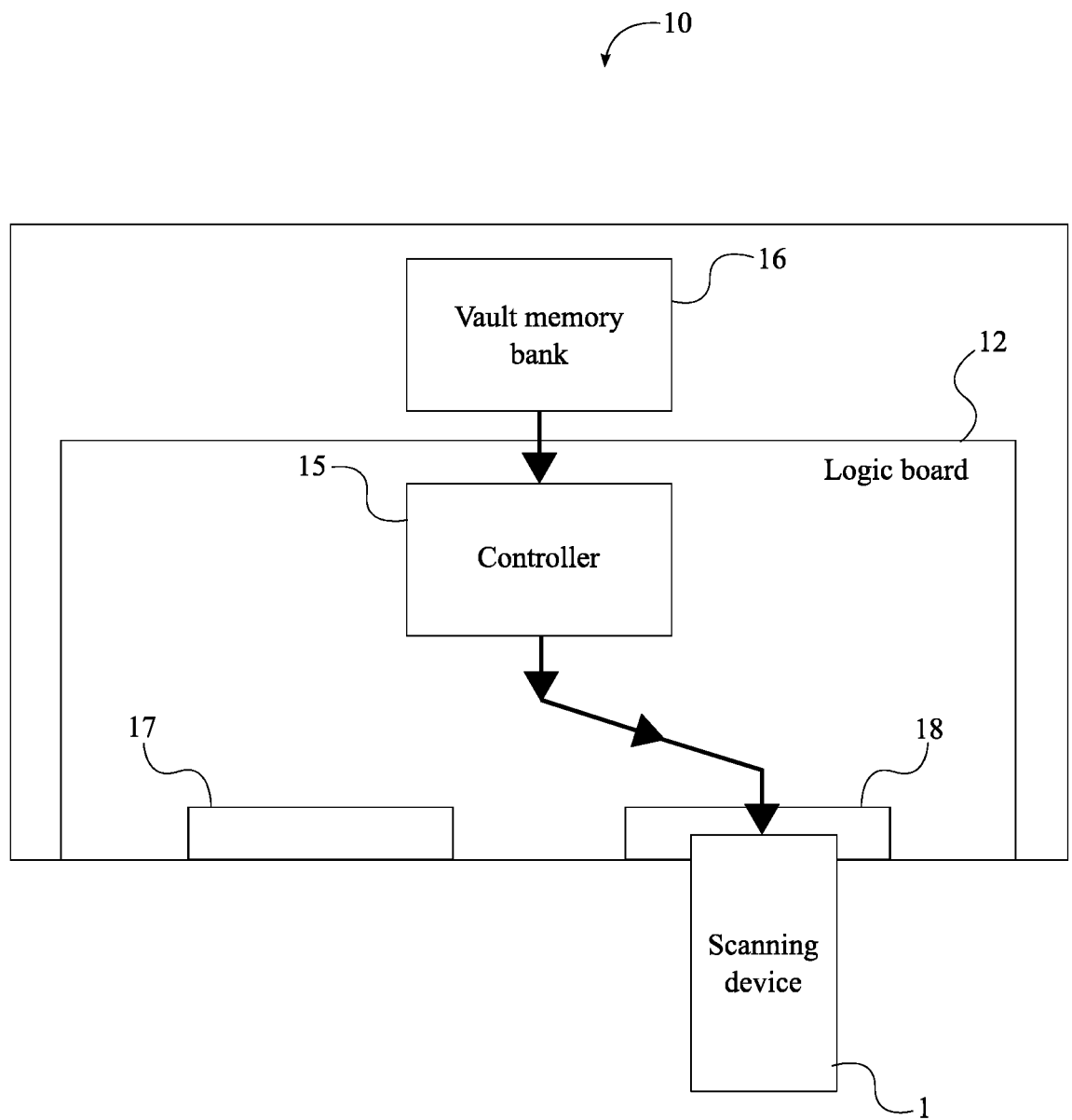
FIG. 16 is a diagram depicting the flow of data when the scanning device is plugged into the second port.

In reference to FIG. 15-16, the data vault 10 can be utilized to both: back-up a recent copy of the digital user profile and the system password for each of the plurality of secured digital systems; and restore the scanning device 1 using the recent copy of the digital user profile and the system password for each of the plurality of secured digital systems. The scanning device 1 is plugged into one of two ports of the data vault 10, wherein one port is provided for carrying out the restore function and the other port is provided for carrying out the back-up function. When the scanning device 1 is first plugged into the data vault 10, the data vault 10 determines the port into which the scanning device 1 is positioned. The microcontroller then performs a handshaking operation with the data vault 10 in order to establish communications between the scanning device 1 and the data vault 10. Once the system user has been authenticated, the data vault 10 performs either the restore function or the back-up function.

Figure 12:
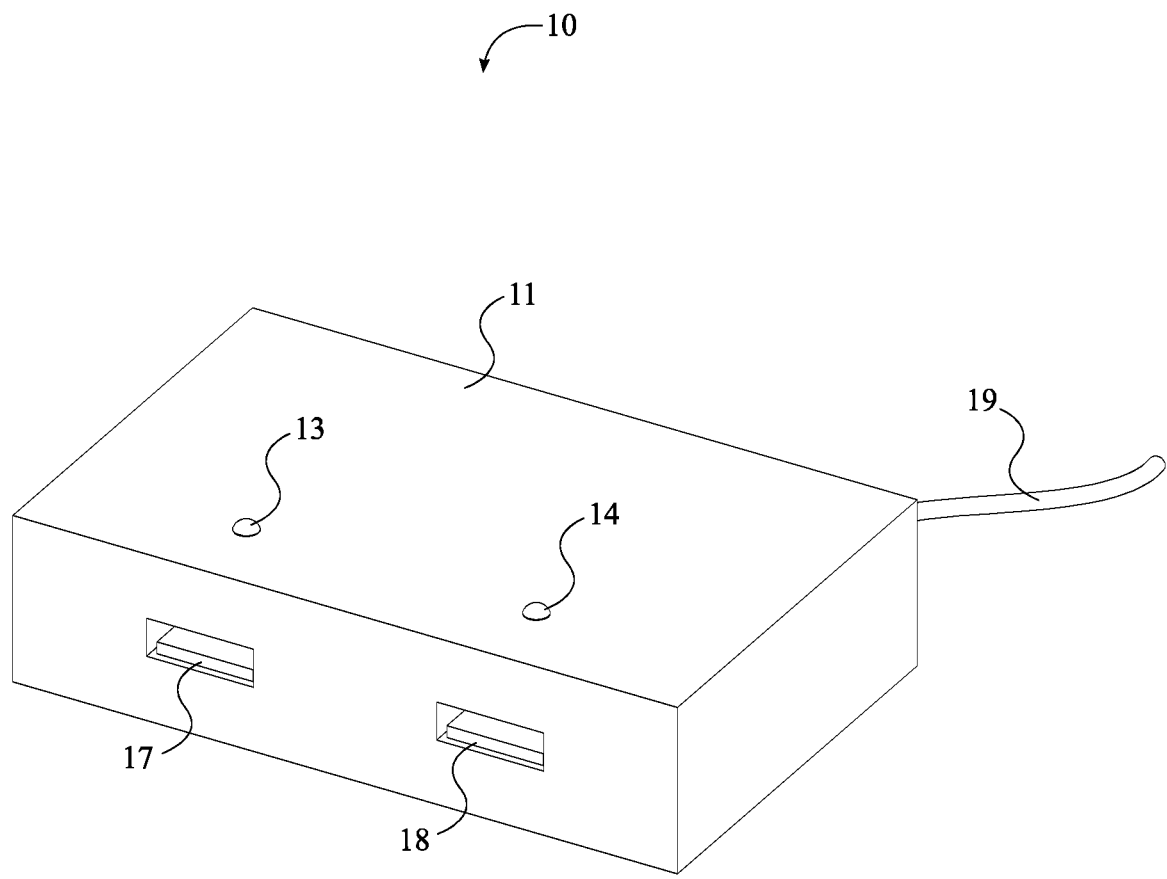
FIG. 12 is a front perspective view of the data vault.
Figure 13:
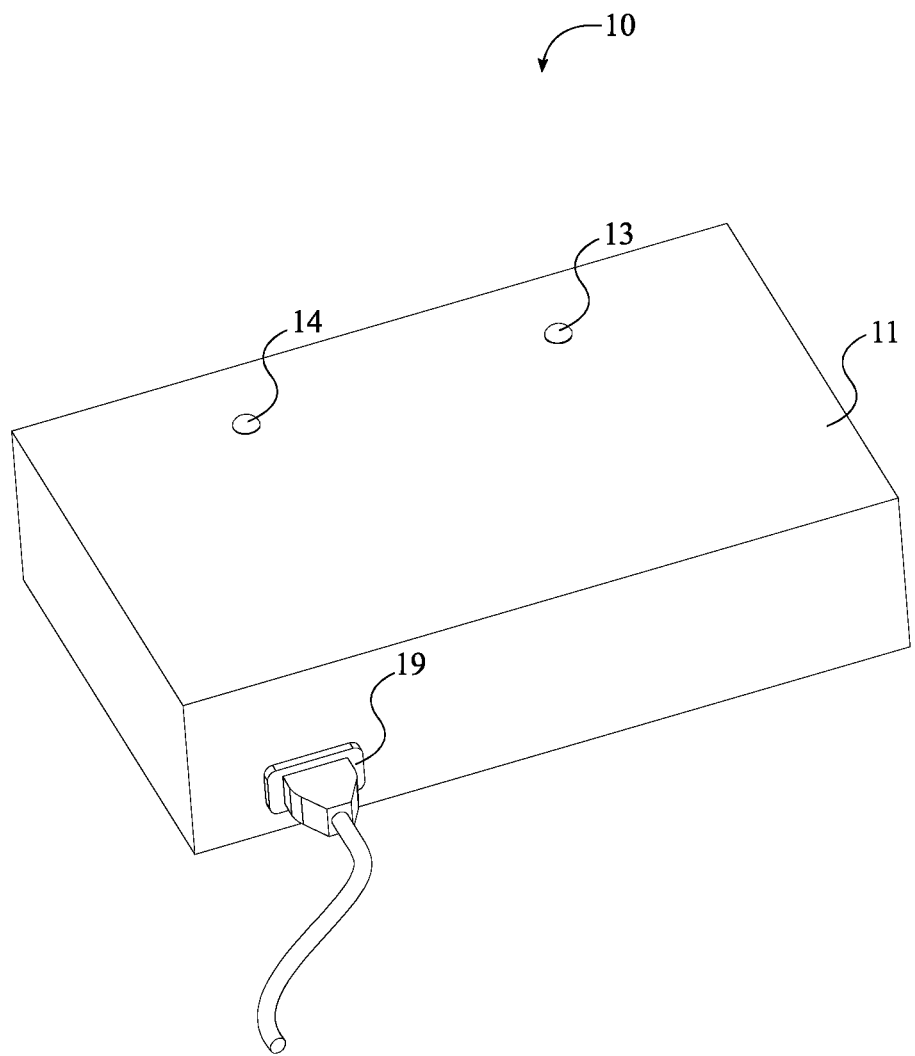
FIG. 13 is a rear perspective view of the data vault.
Figure 14:
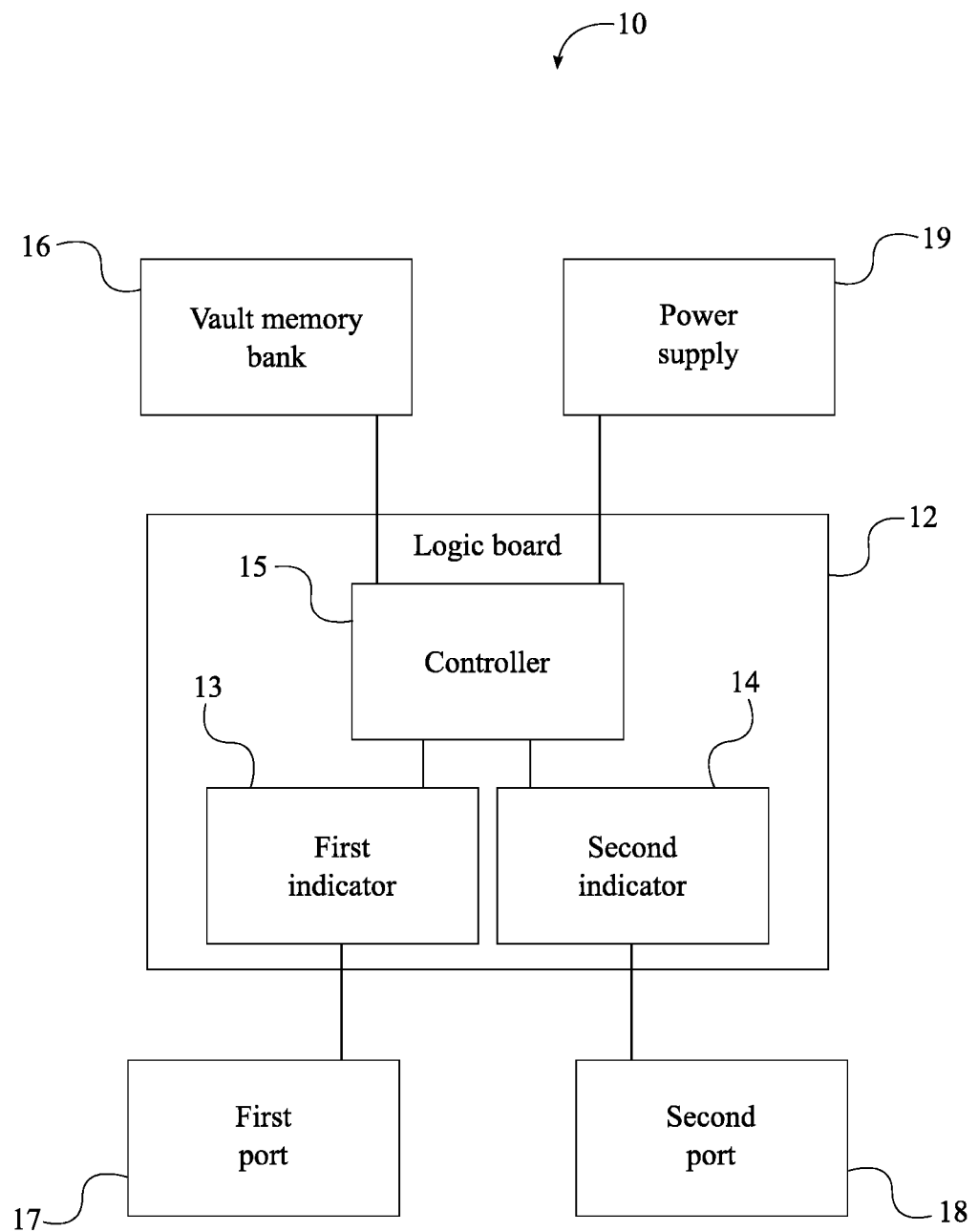
FIG. 14 is a diagram depicting the electronic connections with the logic board, and the electrical connections with the power supply.

In reference to FIG. 12-14, the data vault 10 comprises a vault case 11, a logic board 12, a vault memory bank 16, a first port 17, and a second port 18. The vault case 11 provides a secure enclosure for logic board 12, the vault memory bank 16, the first port 17, and the second port 18. Preferably, the vault case 11 is configured to sit on a flat surface. However, in some embodiments, the vault case 11 may be configured to be mounted or hung from a surface such as a wall, rack, or ceiling. The first port 17 and the second port 18 are mounted within the vault case 11, wherein the first port 17 and the second port 18 are accessible through one face of the vault case 11, as depicted in FIG. 12. Both the first port 17 and the second port 18 are configured to receive the external device interconnect 7 of the scanning device 11. The logic board 12 and the vault memory bank 16 are mounted within the vault case 11, such that the logic board 12 and the vault memory bank 16 cannot be tampered with.

In reference to FIG. 14, the vault memory bank 16, the first port 17, and the second port 18 are electronically connected to the logic board 12, wherein the logic board 12 carries out the processing functions of the data vault 10. The logic board 12 comprises a controller 15, a first indicator 13, and a second indicator 14. The controller 15 is programmed to determine the port into which the scanning device 1 is positioned and in turn determine the appropriate function to perform. In the preferred embodiment, the controller 15 of the logic board 12 is configured to transfer data from the scanning device 1 to the vault memory bank 16 when the scanning device 1 is docked within the first port 17 (i.e. perform the back-up function), as depicted in FIG. 15. Meanwhile, the logic board 12 is configured to transfer data from the vault memory bank 16 to the scanning device 1 when the scanning device 1 is docked within the second port 18 (i.e. perform the restore function), as depicted in FIG. 16. The vault memory bank 16 may be a type of flash memory or other memory type depending on the embodiment.

The first indicator 13 corresponds to one of the ports, while the second indicator 14 correspond to the other port. More specifically, the first indicator 13 corresponds to the first port 17, while the second indicator 14 corresponds to the second port 18, as depicted in FIG. 14. In some embodiments, the first indicator 13 and the second indicator 14 are both multi-colored light emitting diodes that are used as a status indicator. In such embodiments, the first indicator 13 and the second indicator 14 may be illuminated in a first color, such as red, when the scanning device 1 is not docked into the first port 17 or the second port 18, respectively. The first indicator 13 and the second indicator 14 may then switch to a second color, such as green, when the scanning device 1 is docked into the first port 17 or the second port 18, respectively. The first indicator 13 and the second indicator 14 may also utilize a third color to indicate when the controller 15 is performing the function associated with the port into which the scanning device 1 is docked. In other embodiments, the first indicator 13 and the second indicator 14 may be a different type of light, or a different mechanism for signaling the status of the first port 17 and the second port 18 to the system user.

Figure 17:
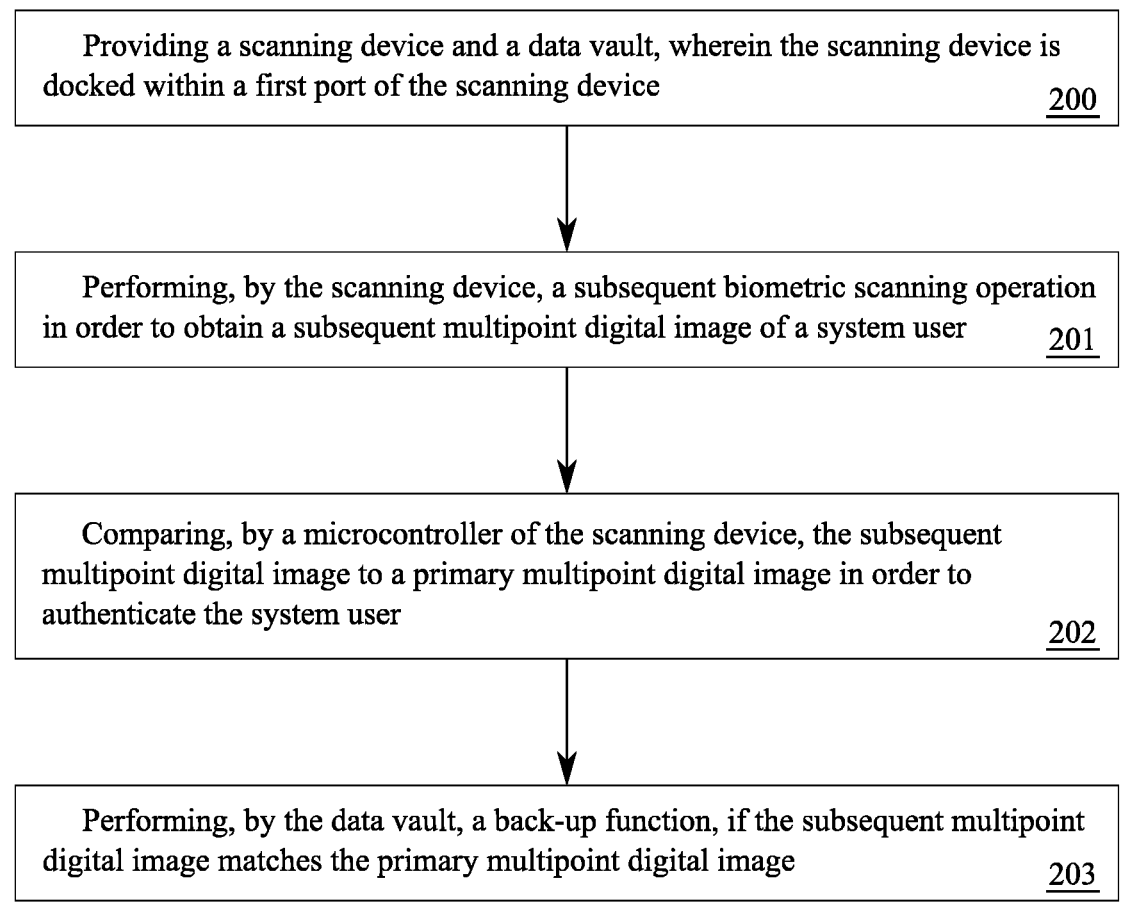
FIG. 17 is a flowchart depicting the steps for performing the back-up function of the data vault.

In reference to FIG. 17, when the external device interconnect 7 of the scanning device 1 is first engaged with the first port 17 of the data vault 10, the controller 15 identifies that the first port 17 is in use and prepares to perform the back-up function [200]. The microcontroller 3 and the controller 15 then perform a handshaking operation with each other in order to establish communications. Once communication has been established between the microcontroller 3 and the controller 15, the system user carries out the subsequent biometric scanning operation in order to obtain the subsequent multipoint digital image [201]. The microcontroller 3 then compares the subsequent multipoint digital image to the primary multipoint digital image in order to authenticate the system user [202]. If the system user is authenticated by matching the subsequent multipoint image to the primary multipoint image, then the microcontroller 3 instructs the controller 15 to perform the back-up function [203]. Conversely, if the subsequent multipoint digital image does not match the primary multipoint digital image, then the back-up function is not carried out.

While performing the back-up function, the digital user profile and the system password for each of the plurality of secured digital systems are transferred from the onboard memory bank 4 to the vault memory bank 16. The digital user profile and the system password for each of the plurality of secured digital systems are stored on the vault memory bank 16 as the recent copy. The next time that the restore function is performed, the recent copy will be loaded onto the scanning device 1. In summary, the scanning software authenticates the system user identity via the anatomical feature and then transfers data from the onboard memory bank 4 to the vault memory bank 16 if the system user is authenticated. In this way, data can only be transferred to the data vault 10 in a secured manner and as designated by the system user.

Figure 18:
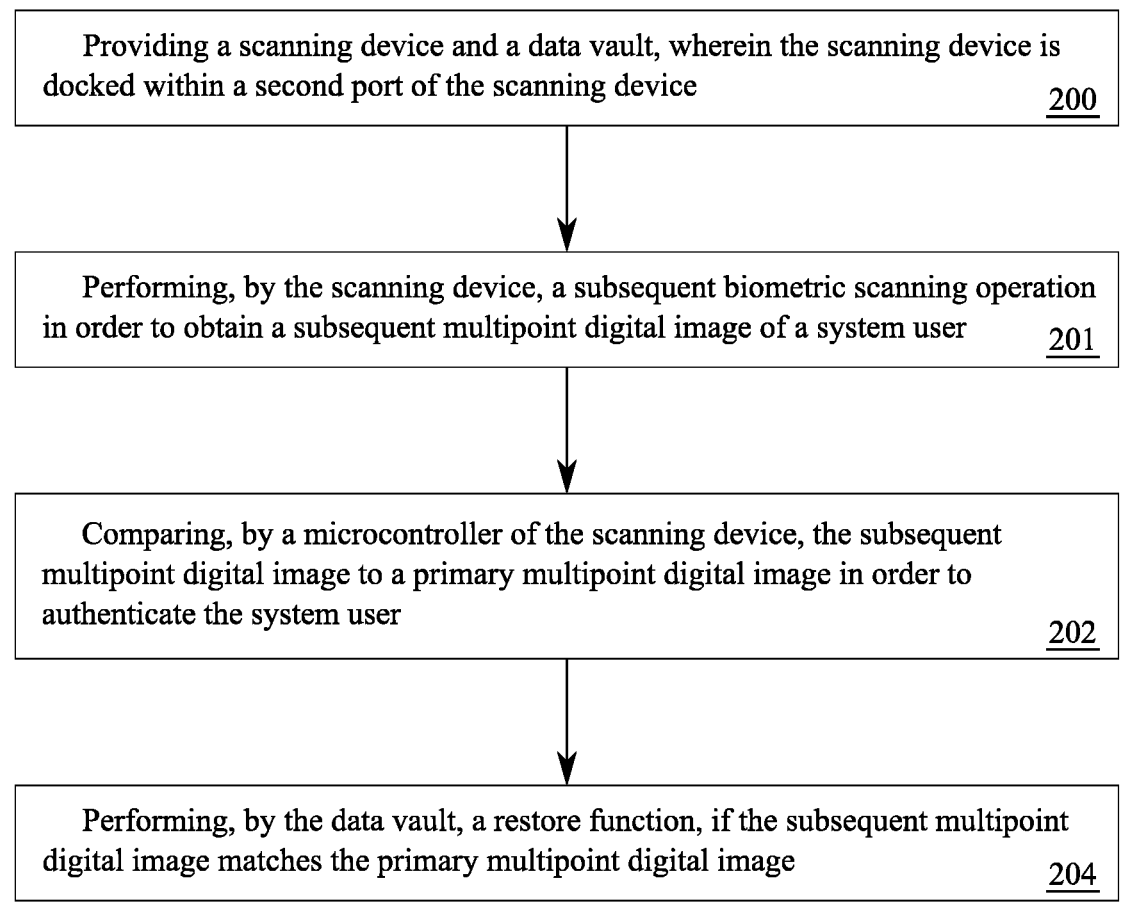
FIG. 18 is a flowchart depicting the steps for performing the restore function of the data vault.

In reference to FIG. 18, when the external device interconnect 7 of the scanning device 1 is first engaged with the second port 18 of the data vault 10, the controller 15 identifies that the second port 18 is in use and prepares to perform the restore function [200]. The microcontroller 3 and the controller 15 then perform a handshaking operation with each other in order to establish communications. Once communication has been established between the microcontroller 3 and the controller 15, the system user carries out the subsequent biometric scanning operation in order to obtain the subsequent multipoint digital image [201]. The microcontroller 3 then compares the subsequent multipoint digital image to the primary multipoint digital image in order to authenticate the system user [202]. If the system user is authenticated by matching the subsequent multipoint image to the primary multipoint image, then the microcontroller 3 instructs the controller 15 to perform the restore function [204]. Conversely, if the subsequent multipoint digital image does not match the primary multipoint digital image, then the restore function is not carried out.

While performing the restore function, the recent copy of the digital user profile and the system password for each of the plurality of secured digital systems is transferred from the vault memory bank 16 to the onboard memory bank 4. The digital user profile and the system password for each of the plurality of secured digital systems from the recent copy are stored on the onboard memory bank 4 for future use with the other external computing devices. In summary, the scanning software authenticates the system user identity via the anatomical feature and then transfers data from the vault memory bank 16 to the onboard memory bank 4 if the system user is authenticated. In this way, only the scanning device 1 is able to access the recent copy of the digital user profile and the system password for each of the plurality of secured digital systems stored on the vault memory bank 16.

In reference to FIG. 13-14, the data vault 10 further comprises a vault power supply 19 that is used to supply power to the logic board 12, the vault memory bank 16, the first port 17, and the second port 18. As such, the vault power supply 19 is electrically connected to the logic board 12, the vault memory bank 16, the first port 17, and the second port 18. In the preferred embodiment of the data vault 10, the vault power supply 19 is an alternating current (AC) adapter that allows the data vault 10 to be plugged into an outlet or other power source. The AC adapter ensures that the other components of the data vault 10 have a constant source of power. A direct current (DC) converter may be used to regulate current between the AC adapter and the other components of the data vault 10. In some embodiments, the vault power supply 19 may be a DC power source such as a battery.

In the preferred embodiment of the present invention, the scanning device 1 is a physical scanner capable of storing user data, connecting to external computing devices, and executing password insertion operations. In reference to FIG. 1-3, the scanning device 1 comprises a housing 5, a control circuit 6, a slot panel 54, and an adjustable scanner mount 56, in addition to the biometric scanner 2, the microcontroller 3, the onboard memory bank 4, and an external device interconnect 7. It is an aim of the scanning device 1 to provide an apparatus capable of acquiring multiple points of data to form a detailed digital representation of the unique characteristics intrinsic to the anatomy of the system user. The scanning device 1 is manufactured to be a self-contained and secured biometric key system. That is, the scanning device 1 is a physical input device which enables the system user to access various digitally secured systems.

In the preferred embodiment of the present invention, the housing 5 is an ergonomically designed rigid enclosure containing the electronic components of the scanning device 1. In reference to FIG. 3, the housing 5 comprises an internal compartment 50, an interconnect channel 55, and an adjustment slot 51. It is an aim of the housing 5 to provide a tamperproof structure which secures the microcontroller 3, the onboard memory bank 4, and the biometric scanner 2 in a tamperproof environment. That is, the housing 5 is constructed from materials which prevent unauthorized access to the internal components stored therein.

Figure 2:
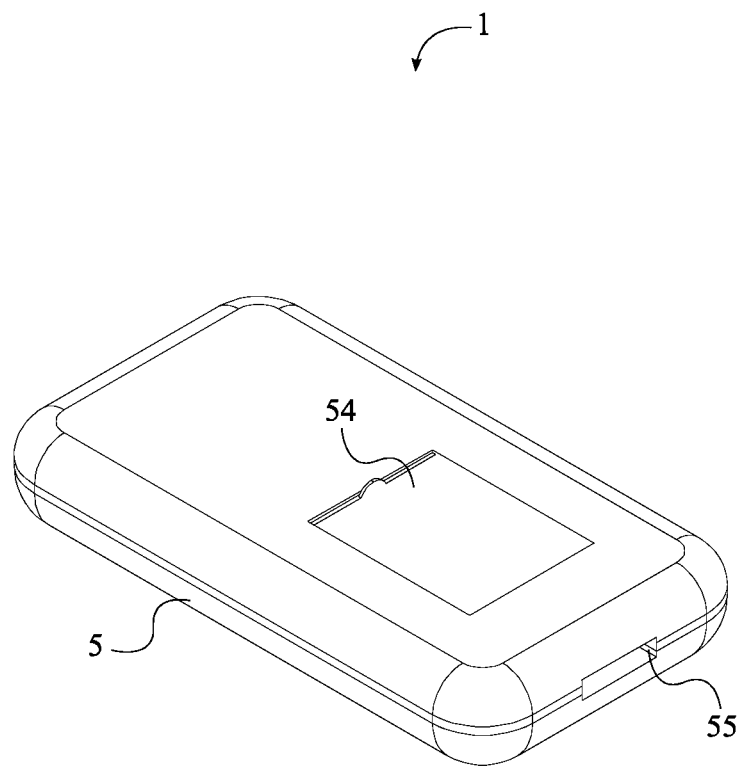
FIG. 2 is a perspective view of the scanning device, wherein the biometric scanner and the external device interconnect are in the retracted position.

In the preferred embodiment of the present invention, the internal compartment 50 is the main enclosure within the housing 5 that secures the biometric scanner 2, the microcontroller 3, the onboard memory bank 4, the control circuit 6, the adjustable scanner mount 56, and the external device interconnect 7. It is an aim of the internal compartment 50, in conjunction with the adjustable scanner mount 56, to provide a structure that enables the system user to transition the biometric scanner 2 and the external device interconnect 7 between a retracted position and an extended position, as shown in FIG. 2 and FIG. 1, respectively. The adjustable scanner mount 56 is slidably mounted within the housing 5 and is used to transition the biometric scanner 2 and the external device interconnect 7 between a retracted position when not in use and an extended position that enables the system user to perform scanning operations.

The adjustment slot 51 is an opening about one face of the housing 5. The adjustment slot 51 is positioned adjacent to the internal compartment 50, wherein the adjustment slot traverses into the internal compartment 50. The adjustment slot 51 allows the biometric scanner 2 to be accessed by the system user to perform scanning operations, when the present invention is configured in the extended position. In some embodiments, the biometric scanner 2 protrudes through the adjustment slot 51 while in the extended position, thus increasing the ease of interfacing with the biometric scanner 2 to obtain a multipoint digital image. In reference to FIG. 3, the internal compartment 50 comprises an adjustment rail 52 that allows the adjustable scanner mount 56 to slide within the housing 5. The adjustment rail 52 may be one or more tracks that extend from one or more of the interior walls of the housing that form the internal compartment 50. The adjustable scanner mount 56 is engaged with the adjustment rail 52, such that the adjustment rail 52 defines a fixed path of movement of the adjustable scanner mount 56 within the internal compartment 50.

The biometric scanner 2 and the external device interconnect 7 are mounted onto the adjustable scanner mount 56, such that the biometric scanner 2, the external device interconnect 7, and the adjustable scanner mount 56 move in tandem. As such, the adjustment rail 52 defines the path along which the biometric scanner 2 and the external device interconnect 7 travel while transitioning between the extended position and the retracted position. In the extended position, the biometric scanner 2 is positioned adjacent to the adjustment slot 51, while the external device interconnect 7 traverses out of the housing 5 through the interconnect channel 55. Meanwhile, in the retracted position, the biometric scanner is offset from the adjustment slot 51, while the external device interconnect 7 is positioned within the housing 5.

Figure 3:
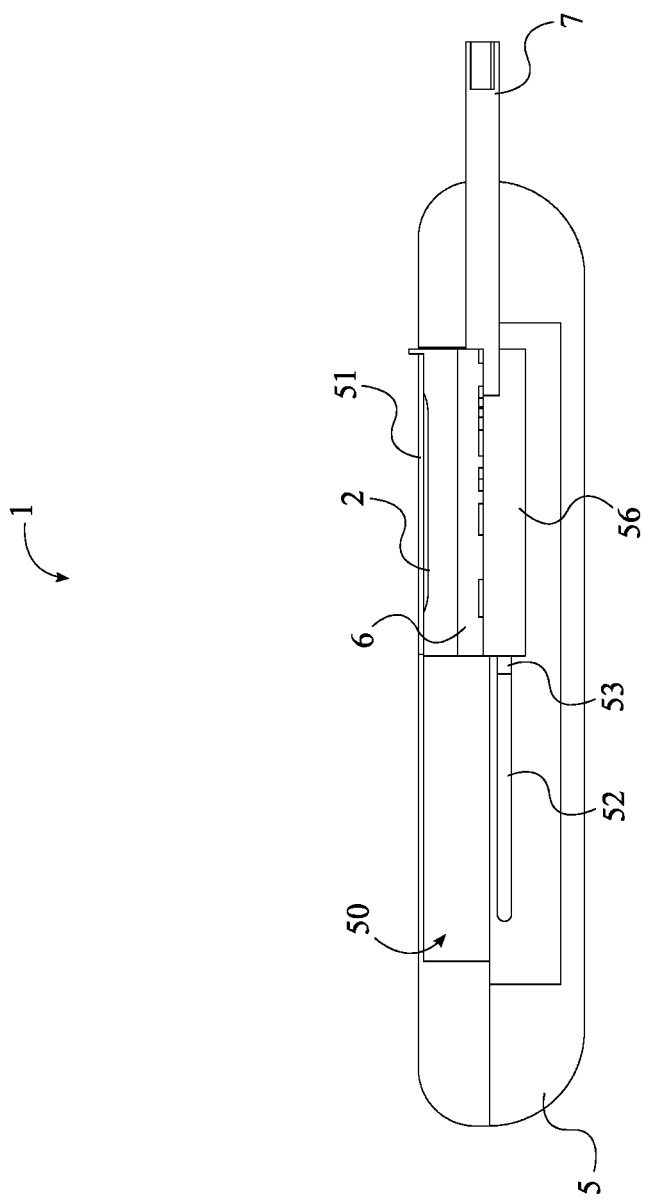
FIG. 3 is a left-side sectional view of the scanning device showing the components positioned within the housing.

In reference to FIG. 3, the internal compartment 50 may further comprise an adjustment locking mechanism 53, wherein the adjustable scanner mount 56 is selectively engaged with the adjustable locking mechanism 53. In the preferred embodiment of the present invention, the adjustment locking mechanism 53 retains the biometric scanner 2 and the external device interconnect 7 in the extended position while the locking mechanism 53 is engaged with the adjustable scanner mount 56. That is, when the system user slides the biometric scanner 2 into the extended position, the adjustment locking mechanism 53 becomes engaged, and prevents the biometric scanner 2 from being moved into the retracted position until disengaged. The adjustment locking mechanism 53 may also be used to retain the biometric scanner 2 and the external device interconnect 7 in the retracted position, such that the biometric scanner 2 and the external device interconnect 7 are not inadvertently exposed.

In a first embodiment, the adjustment locking mechanism 53 is positioned along the adjustment rail 52, wherein the adjustment locking mechanism 53 is a ridge of material protruding from the adjustment rail 52. As the system user slides the biometric scanner 2 into the extended position, the adjustable scanner mount 56 passes over the ridge. Once the adjustable scanner mount 56 passes over the adjustment locking mechanism 53, the adjustable scanner mount 56 becomes wedged between the adjustment locking mechanism 53 and an interior wall of the housing 5. In this position, the external device interconnect 7 is protruding from the interconnect channel 55 and able to establish a physical connection with an external computing device. To disengage the adjustment locking mechanism 53 in the first embodiment, the system user must apply force in one direction to dislodge the adjustable scanner mount 56.

In a second embodiment the adjustment locking mechanism 53 is a button slider, which retains the biometric scanner 2 in the extended position when engaged. To disengage the adjustment locking mechanism 53 in the second embodiment, the system user moves the button slider into the unlocked position. In other embodiments, the adjustable locking mechanism 53 may include other components such as a spring mechanism or other moveable locking parts that are used to re-position the adjustable scanner mount 56 within the housing 5 when the adjustable locking mechanism 53 is actuated by the system user.

In reference to FIG. 2, in the preferred embodiment of the present invention, the slot panel 54 is a protective covering that is slidably mounted to the housing 5, about the adjustment slot 51. The slot panel 54 slides into place, sealing the adjustment slot 51 as the biometric scanner 2 is moved into the retracted position. While the biometric scanner 2 is in the retracted position, the slot panel 54 is in a closed position, wherein the slot panel 54 is positioned adjacent to the adjustment slot 51 to prevent access into the internal compartment 50. The slot panel 54 prevents unauthorized users from accessing the biometric scanner 2 while in the closed position. The slot panel 54 is retracted from the adjustment slot 51, into an opened position, as the biometric scanner 2 is transitioned into the extended position. In the opened position, the slot panel 54 is offset from the adjustment slot 51, such that the biometric scanner 2 may be accessed by the system user through the adjustment slot 51.

The interconnect channel 55 is a hole extending from the internal compartment 50 out of the exterior of the housing 5. That is, the interconnect channel 55 is positioned adjacent to the internal compartment 50 and forms an opening into the internal compartment 50, similar to the adjustment slot 51. The interconnect channel 55 forms the pathway through which the external device interconnect 7 travels while being transitioned between the retracted position and the extended position. In the retracted position, the external device interconnect 7 is at least partially stored within the interconnect channel 55. While transitioning from the retracted position to the extended position, the external device interconnect 7 passes through the interconnect channel 55, wherein the external device interconnect 7 protrudes from the housing 5 while in the extended position. In this way, the external device interconnect 7 may interface with an external computing device while in the extended position.

In the preferred embodiment of the present invention, the microcontroller 3 is adjacently connected to the adjustable scanner mount 56, while the biometric scanner 2 is mounted onto the microcontroller 3, such that the microcontroller 3 is positioned in between the adjustable scanner mount 56 and the biometric scanner 2. As such, the adjustable scanner mount 56 forms the intermediary connector between the housing 5 and both the microcontroller 3 and the biometric scanner 2. The biometric scanner 2 is oriented towards the adjustment slot, such that the biometric scanner 2 can be accessed by the system user when the adjustable scanner mount 56 is slid along the adjustment rail 52 into the extended position. Furthermore, the external device interconnect 7 is connected to the microcontroller 3, such that the external device interconnect 7 is oriented towards the interconnect channel 55. In this way, the external device interconnect 7 may traverse through the interconnect channel 55 when the adjustable scanner mount 56 is displaced within the housing 5.

In the preferred embodiment of the present invention the biometric scanner 2 is a device used to create digital representations of unique body characteristics of the system user. The biometric scanner 2 is slidably attached to the housing 5 via the connection formed between the adjustable scanner mount 56 and the adjustment rail 52. It is an aim of the biometric scanner 2 to provide a sensory unit which is manipulated by the system user to move from a hidden position (i.e. the retracted position) into an exposed position (i.e. the extended position). In reference to FIG. 1, in the extended position the system user is able to access the scanning element of the biometric scanner 2. In the extended position the system users is able to place fingers to be scanned onto the biometric scanner 2. The external device interconnect 7 is a universally accepted electrical connector which forms a physical connection between the scanning device 1 and an external computing device. Embodiments of the scanning device 1 are designed using industry standard data transfer protocols such as universal serial bus protocol, high-definition multimedia interface protocol, Ethernet protocol, and the like.

Figure 4:
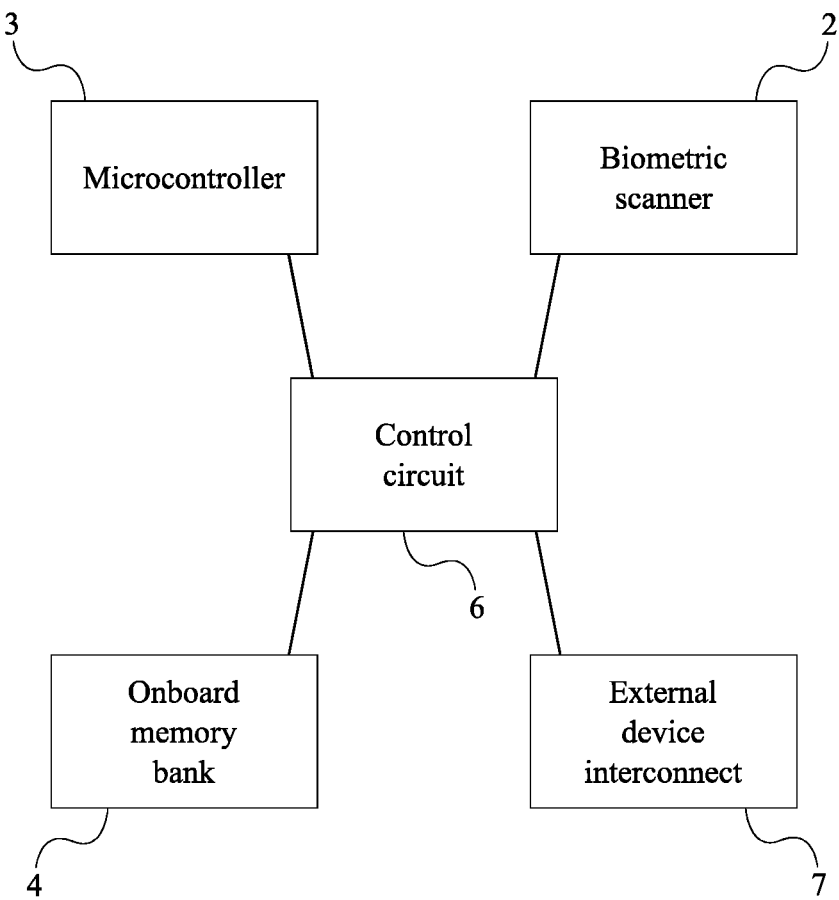
FIG. 4 is a diagram depicting the electronic connections through the control circuit.

In the preferred embodiment of the present invention, the microcontroller 3 functions as the central processing unit which coordinates communication between the scanning device 1 and the external computing devices, correlates acquired biometric data to the system password of each of the plurality of secured digital systems, and encrypts all data stored on the onboard memory bank 4. The external device interconnect 7, the biometric scanner 2, and the onboard memory bank 4 are electronically connected to the microcontroller 3. The microcontroller 3 is maintained in electrical communication with the biometric scanner 2, the external device interconnect 7, and the onboard memory bank 4 via the control circuit 6, as depicted in FIG. 4. Data and electrical power is transferred between these devices via the control circuit 6. The onboard memory bank 4 is used as storage for any scanned biometric data and the system password of each of the plurality of secured digital systems.

Figure 5:
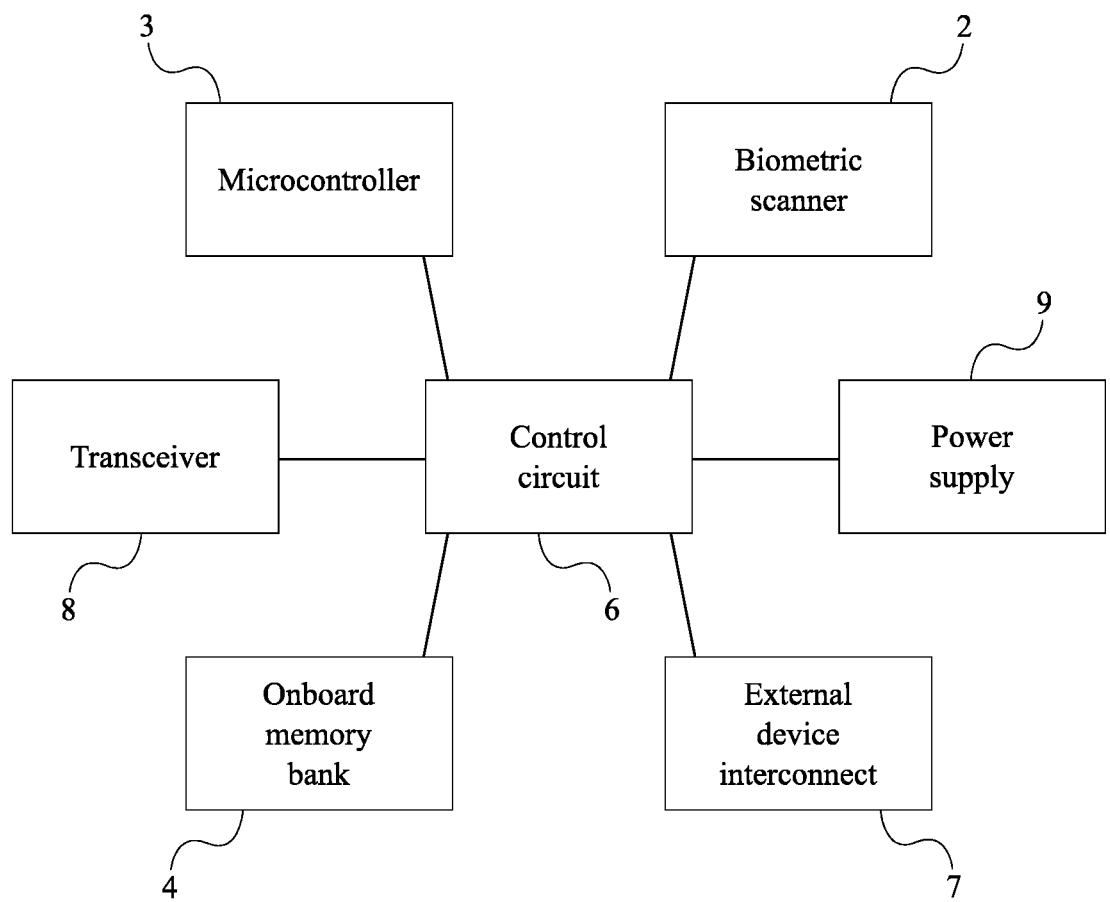
FIG. 5 is a diagram thereof, wherein the transceiver and power supply are electronically connected to the control circuit.

In reference to FIG. 5, in some embodiments, the scanning device 1 further comprises a transceiver 8 and a power supply 9; the transceiver 8 being electronically connected to the microcontroller 3 via the control circuit 6. Using the transceiver 8, the scanning device 1 is able to wirelessly connect to, and communicate with, external computing devices using wireless communication protocols such as WI-FI, near field communication, Bluetooth, and the like. The power supply 9 is electrically connected to the biometric scanner 2, the microcontroller 3, the onboard memory bank 4, and the transceiver 8, wherein the power supply 9 provides current to the other electrical components of the scanning device 1. The power supply 9 may also be electrically connected to the external device interconnect 7 in some embodiments. In some embodiments, the transceiver 8 may be used without the power supply 9 and vice versa.

In an alternative embodiment of the present invention, the scanning device 1 is integrated into a credit card. In this embodiment, the anatomical feature (e.g. a finger) of the system user functions as an electrical contact switch in conjunction with the biometric scanner 2. When the credit card is inserted into a merchant terminal, the system user places the finger on the biometric scanner 2, wherein the finger completes an electrical circuit formed by the credit card and the merchant terminal. With the finger completing the circuit between the credit card and the merchant terminal, current is passed through the credit card in order to power the scanning device 1.

The alternative embodiment, the external device interconnect 7 comprises a first terminal and a second terminal, and the control circuit 6 is a digital circuitry. The first terminal and the second terminal are positioned opposite the biometric scanner 2, along the credit card body (i.e. the housing 5), wherein the first terminal and the second terminal provide electrical contacts that engage the merchant terminal. Meanwhile, the digital circuitry is integrated throughout the credit card and electrically connects the first terminal and the second terminal to the biometric scanner 2. When the credit card is inserted into the merchant terminal and the system user places the finger on the biometric scanner 2, current is drawn from the merchant terminal to power the scanning device 1. Once current is supplied to the scanning device 1, the biometric scanner 2 reads twenty-four points of biometric information to generate the subsequent multipoint digital image and validate the identity of the system user using the primary multipoint digital image. The present invention then allows and authorizes the transaction to go through.

In the preferred embodiment of the present invention, the scanning software is a program tasked with acquiring biometric data and communicating the biometric data between the scanning device 1 and the external computing devices. The scanning software comprises a profile engine, a scanning engine, an application programming interface (API) engine, a password engine, and an encryption engine. It is an aim of the scanning software to provide a program which works in concert with the scanning device 1 to create a system that uses a single device to access multiple digital systems. The term engine is used herein to refer to collections of programs which are grouped based upon function.

The profile engine is tasked with storing personal user data of the system user, the list of the plurality of secured digital systems, and the system password associated with each of the plurality of secured digital systems. Meanwhile, the API engine is tasked with performing all of the handshaking operations required to communicate with the external digital system and send the system password for the specific secured digital system to the specific secured digital system. That is, the API engine communicates with the specific secured digital system, and is used to insert the appropriate password into the specific secured digital system.

In the preferred embodiment of the present invention, the scanning engine controls the operation of the biometric scanner 2. The scanning engine is tasked with forming the primary multipoint digital image of the anatomical feature of the system user. The primary multipoint digital image uses multiple points of data which correspond to the unique physical features of the anatomical feature. In the preferred embodiment of the present invention, the primary multipoint digital image generated by the scanning engine contains at least twenty-four unique data points of a fingerprint.

In the preferred embodiment of the present invention, the password engine is used to create unique passwords for the plurality of secured digital systems which do not currently exist within, and need to be added to, the digital user profile. The profile engine enables the system user to create unique passwords for any secured digital system by connecting the scanning device 1 to an external computing device and performing a scanning operation. More specifically, the primary multipoint digital image is used as each of the unique passwords. In the preferred embodiment of the present invention, the encryption engine secures any data created by the scanning software. More particularly, the encryption engine encrypts the system password for each of the plurality of secured digital systems, the personal user data, and biometric data used by the present invention.

Although the invention has been explained in relation to its preferred embodiment, it is to be understood that many other possible modifications and variations can be made without departing from the spirit and scope of the invention as hereinafter claimed.

The invention claimed is:

1. A method of accessing a plurality of secured digital systems with a scanning device having a memory, the method comprising:
performing a primary biometric scanning operation with the scanning device in order to obtain a primary multipoint digital image of an anatomical feature of a secured digital system user,
encrypting the primary multipoint digital image;
storing the encrypted primary multipoint digital image in a memory of the scanning device;
receiving a digital user profile that includes a list of a plurality of secured digital systems and a system password for each of the plurality of secured digital systems;
encrypting the digital user profile;
storing the encrypted digital user profile in the memory of the scanning device;
mapping the primary multipoint digital image to the digital user profile;
receiving an indication of a selection of at least one of the plurality of secured digital systems;
in response to receiving the indication of a selection of at least one of the plurality of secured digital systems, performing a subsequent biometric scanning operation in order to obtain a subsequent multipoint digital image;
determining if the subsequent multipoint digital image matches the primary multipoint digital image; and
if the subsequent multipoint digital image matches the primary multipoint digital image:
connecting the scanning device to a network;
initiating a handshaking operation with the selected secured digital system;
retrieving a system password for the selected secured digital system;
providing the system password to the selected secured digital system; and
disconnecting the scanning device from the network once the system password has been provided to the selected secured digital system.

2. The method of claim 1 further comprising:
performing a second subsequent biometric scanning operation in order to obtain a second subsequent multipoint digital image;
determining if the second subsequent multipoint digital image matches the primary multipoint digital image; and
if the second subsequent multipoint digital image matches the primary multipoint digital image, performing an update function whereby the digital user profile is updated.

3. The method of claim 1 wherein the method is performed with a scanning device further comprising:
connecting the scanning device to a data vault containing a data vault memory,
performing a second subsequent biometric scanning operation in order to obtain a second subsequent multipoint digital image;
determining if the second subsequent multipoint digital image matches the primary multipoint digital image;
if the second subsequent multipoint digital image matches the primary multipoint digital image, performing a back-up function whereby the primary multipoint digital image and digital user profile are stored in the data vault memory; and
disconnecting the scanning device from the data vault.

4. The method of claim 1 wherein the method is performed with a scanning device further comprising:
connecting the scanning device to a data vault containing a data vault memory,
performing a second subsequent biometric scanning operation in order to obtain a second subsequent multipoint digital image;
determining if the second subsequent multipoint digital image matches the primary multipoint digital image;
if the second subsequent multipoint digital image matches the primary multipoint digital image, performing a restore function whereby the primary multipoint digital image and digital user profile are retrieved from the data vault memory and provided to the scanning device; and
disconnecting the scanning device from the data vault.

5. The method of claim 1 wherein the method is performed with a scanning device and receiving an indication of a selection of at least one of the plurality of secured digital systems further comprises connecting the scanning device to an external computing device and receiving the indication of the selection of at least one of the plurality of secured digital systems from the external computing device.

6. The method of claim 1 further comprising using scanning software to create or retrieve the digital user profile.

7. The method of claim 1 further comprising using scanning software to analyze the multipoint digital image.

8. The method of claim 1 further comprising generating a password or username for a secured digital system based on the primary multipoint digital image.

9. The method of claim 1 wherein the method is performed with a scanning device further comprising performing a back-up function if the scanning device is connected to a first port of a data vault and performing a restore function if the scanning device is connected to a second port of the data vault.

10. A system for utilizing biometric data to authenticate an individual across multiple secured digital systems, the system comprising:
a scanning device comprising a housing, an external device interconnect, a biometric scanner, a microcontroller and a memory;
the microcontroller and memory configured to:
perform a primary biometric scanning operation in order to obtain a primary multipoint digital image from the biometric scanner of an anatomical feature of a secured digital system user;
encrypt the primary multipoint digital image;
receive a digital user profile that includes a list of a plurality of secured digital systems and a system password for each of the plurality of secured digital systems;
encrypt the digital user profile;
map the primary multipoint digital image to the digital user profile;
receive an indication of a selection of at least one of the plurality of secured digital systems;

in response to receiving the indication of a selection of at least one of the plurality of secured digital systems, use the biometric scanner to perform a subsequent biometric scanning operation in order to obtain a subsequent multipoint digital image;

determine if the subsequent multipoint digital image matches the primary multipoint digital image; and if the subsequent multipoint digital image matches the primary multipoint digital image:
connect the scanning device to a network;
initiate a handshaking operation with the selected secured digital system;
retrieve a system password for the selected secured digital system;
provide the system password to the selected secured digital system; and
disconnect the scanning device from the network once the system password has been provided to the selected secured digital system.

11. The system of claim 10 wherein the microcontroller and memory are configured to:
perform a second subsequent biometric scanning operation in order to obtain a second subsequent multipoint digital image;
determine if the second subsequent multipoint digital image matches the primary multipoint digital image; and
if the second subsequent multipoint digital image matches the primary multipoint digital image, perform an update function whereby the digital user profile is updated.

12. The system of claim 10 wherein the microcontroller and memory are configured to:
perform a second subsequent biometric scanning operation in order to obtain a second subsequent multipoint digital image when the scanning device is connected to a data vault containing a data vault memory;
determine if the second subsequent multipoint digital image matches the primary multipoint digital image; and
if the second subsequent multipoint digital image matches the primary multipoint digital image, perform a back-up function whereby the primary multipoint digital image and digital user profile are stored in the data vault memory.

13. The system of claim 10 wherein the microcontroller and memory are configured to:
perform a second subsequent biometric scanning operation in order to obtain a second subsequent multipoint digital image when the scanning device is connected to a data vault containing a data vault memory;
determine if the second subsequent multipoint digital image matches the primary multipoint digital image; and
if the second subsequent multipoint digital image matches the primary multipoint digital image, perform a restore function whereby the primary multipoint digital image and digital user profile are retrieved from the data vault memory and provided to the scanning device.

14. The system of claim 10 wherein receive an indication of a selection of at least one of the plurality of secured digital systems further comprises connect the scanning device to an external computing device and receive the indication of the selection of at least one of the plurality of secured digital systems from the external computing device.

15. The system of claim 10 further comprising scanning software that creates or retrieves the digital user profile.

16. The system of claim 10 further comprising scanning software that analyzes the multipoint digital image.

17. The system of claim 10 wherein the microcontroller and memory are configured to generate a password or username for a secured digital system based on the primary multipoint digital image.

18. The system of claim 10 further comprising a data vault comprising a first port and a second port wherein the microcontroller and memory are further configured to perform a back-up function if the external device interconnect is connected to the first port and a restore function if the external device interconnect is connected to the second port.

19. A method of storing biometric data to authenticate an individual across multiple secured digital systems, the method comprising:
receiving and storing a primary multipoint digital image of an anatomical feature of a secured digital system user;
encrypting the primary multipoint digital image;
receiving and storing a digital user profile that includes a list of a plurality of secured digital systems and a system password for each of the plurality of secured digital systems;
encrypting the digital user profile;
receiving a subsequent multipoint digital image from an external computing device and a request to restore the primary multipoint digital image and digital user profile;
determining if the subsequent multipoint digital image matches the primary multipoint digital image; and
if the subsequent multipoint digital image matches the primary multipoint digital image:
connecting to an external computing device;
providing the digital user profile to the external computing device; and
disconnecting from the external computing device once the digital user profile has been provided to the external computing device.

20. The method of claim 19 further comprising if the subsequent multipoint digital image matches the primary multipoint digital image, providing the primary multipoint digital image to the external computing device.

* * * * *